US010136111B2

(12) United States Patent
Egawa

(10) Patent No.: US 10,136,111 B2
(45) Date of Patent: Nov. 20, 2018

(54) WAVELENGTH CONVERTER, ILLUMINATOR, AND PROJECTOR

(71) Applicant: Seiko Epson Corporation, Tokyo (JP)

(72) Inventor: Akira Egawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/284,194

(22) Filed: Oct. 3, 2016

(65) Prior Publication Data
US 2017/0099467 A1 Apr. 6, 2017

(30) Foreign Application Priority Data

Oct. 6, 2015 (JP) ................. 2015-198268

(51) Int. Cl.
G02B 26/00 (2006.01)
H04N 9/31 (2006.01)
G03B 21/20 (2006.01)
G03B 21/16 (2006.01)

(52) U.S. Cl.
CPC ......... H04N 9/3114 (2013.01); G02B 26/008 (2013.01); G03B 21/16 (2013.01); G03B 21/204 (2013.01); H04N 9/3105 (2013.01); H04N 9/3144 (2013.01); H04N 9/3158 (2013.01)

(58) Field of Classification Search
CPC ....... G02B 26/00; G03B 21/008; G03B 21/16
USPC ............................................. 353/61; 359/892
See application file for complete search history.

(56) References Cited

U.S. PATENT DOCUMENTS

| 2009/0126903 | A1* | 5/2009 | Kuibira ............ H05K 7/20963 165/67 |
| 2015/0215569 | A1* | 7/2015 | Li .......................... G09G 5/02 348/760 |
| 2016/0077325 | A1* | 3/2016 | Tsai ..................... G02B 26/008 353/31 |
| 2016/0077326 | A1* | 3/2016 | Yamagishi .......... G02B 26/008 353/61 |

FOREIGN PATENT DOCUMENTS

| JP | 2012-013897 | * | 1/2012 | ............ G03B 21/14 |
| JP | 2012-13897 A | | 1/2012 | |
| JP | WO 2016056285 A1 | * | 4/2016 | ............ G03B 21/00 |

OTHER PUBLICATIONS

Machine translation of WO 2016056285.*

* cited by examiner

Primary Examiner — Steven H Whitesell Gordon
Assistant Examiner — Jerry Brooks
(74) Attorney, Agent, or Firm — ALG Intellectual Property, LLC

(57) ABSTRACT

The invention relates to a wavelength converter including a rotating device, a substrate rotated by the rotating device, a wavelength conversion element provided on a first surface of the substrate, and a heat sink that is provided on a second surface facing away from the first surface and is a member different from the substrate. The heat sink includes a plurality of fins, and the substrate is formed of a light transmissive member.

12 Claims, 6 Drawing Sheets

WAVELENGTH CONVERTER, ILLUMINATOR, AND PROJECTOR

CROSS-REFERENCE TO RELATED APPLICATION

The entire disclosure of Japanese Patent Application No. 2015-198268, filed Oct. 6, 2015 is expressly incorporated by reference herein.

BACKGROUND

1. Technical Field

The present invention relates to a wavelength converter, an illuminator, and a projector.

2. Related Art

In recent years, a phosphor is used as an illuminator for a projector.

In the illuminator described in JP-A-2012-13897, the rear surface of a substrate that supports a phosphor (wavelength conversion element) is provided with cooling fins. The substrate and the cooling fins are integrated with each other.

The related art described above, however, relates to a reflective wavelength converter and does not contemplate a transmissive wavelength converter. It is therefore desired to provide a novel technology for cooling a phosphor in a transmissive wavelength converter.

SUMMARY

An advantage of some aspects of the invention is to provide a wavelength converter, an illuminator, and a projector capable of cooling a wavelength conversion element in a transmissive form.

According to a first aspect of the invention, a wavelength converter is provided. The wavelength converter includes a rotating device, a substrate rotated by the rotating device, a wavelength conversion element provided on a first surface of the substrate, and a heat sink that is provided on a second surface facing away from the first surface and is a member different from the substrate. The heat sink includes a plurality of fins, and the substrate is formed of a light transmissive member.

According to the wavelength converter according to the first aspect, the heat sink can cool the wavelength conversion element. A transmissive wavelength converter in which the wavelength conversion element is cooled so that the temperature of the wavelength conversion element is lowered is therefore provided.

In the first aspect described above, it is preferable that the plurality of fins are provided in a position closer to a center of rotation of the rotating device than the wavelength conversion element.

According to the configuration described above, the size of the wavelength conversion element can be maximized. A situation in which light is intensively incident on the same portion of the wavelength conversion element can be avoided. An increase in the temperature of the wavelength conversion element can be therefore be suppressed.

In the first aspect described above, it is preferable that the wavelength conversion element is provided in a position closer to a center of rotation of the rotating device than the plurality of fins.

According to the configuration described above, the plurality of fins can be enlarged, whereby the cooling performance of the heat sink can be improved.

In the first aspect described above, it is preferable that each of the plurality of fins has an inclining shape at at least one of a side portion facing the rotating device and a side portion facing an outer circumference of the substrate. In this case, the inclining shape is more desirably so configured that the side portion so inclines as to approach or to be separate away from the center of rotation of the rotating device with distance from the substrate.

According to the configuration described above, the inclining shape prevents light incident on the wavelength conversion element from interfering with the fins. The light is therefore allowed to be incident on the wavelength conversion element in a satisfactory manner.

According to a second aspect of the invention, an illuminator is provided. The illuminator includes a light source and the wavelength converter according to the first aspect described above, and light that belongs to a first wavelength band and is emitted from the light source is caused to be incident on the second surface, and light that belongs to a second wavelength band and is converted by the wavelength conversion element is caused to exit through the first surface.

The illuminator according to the second aspect, which includes the transmissive wavelength converter in which an increase in the temperature of the wavelength conversion element is suppressed, can produce bright illumination light.

According to a third aspect of the invention, a projector is provided. The projector includes the illuminator according to the second aspect, a light modulator that modulates illumination light from the illuminator in accordance with image information to form image light, and a projection system that projects the image light.

The projector according to the third aspect, which includes the illuminator according to the second aspect described above, can display an image that is bright and excels in quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
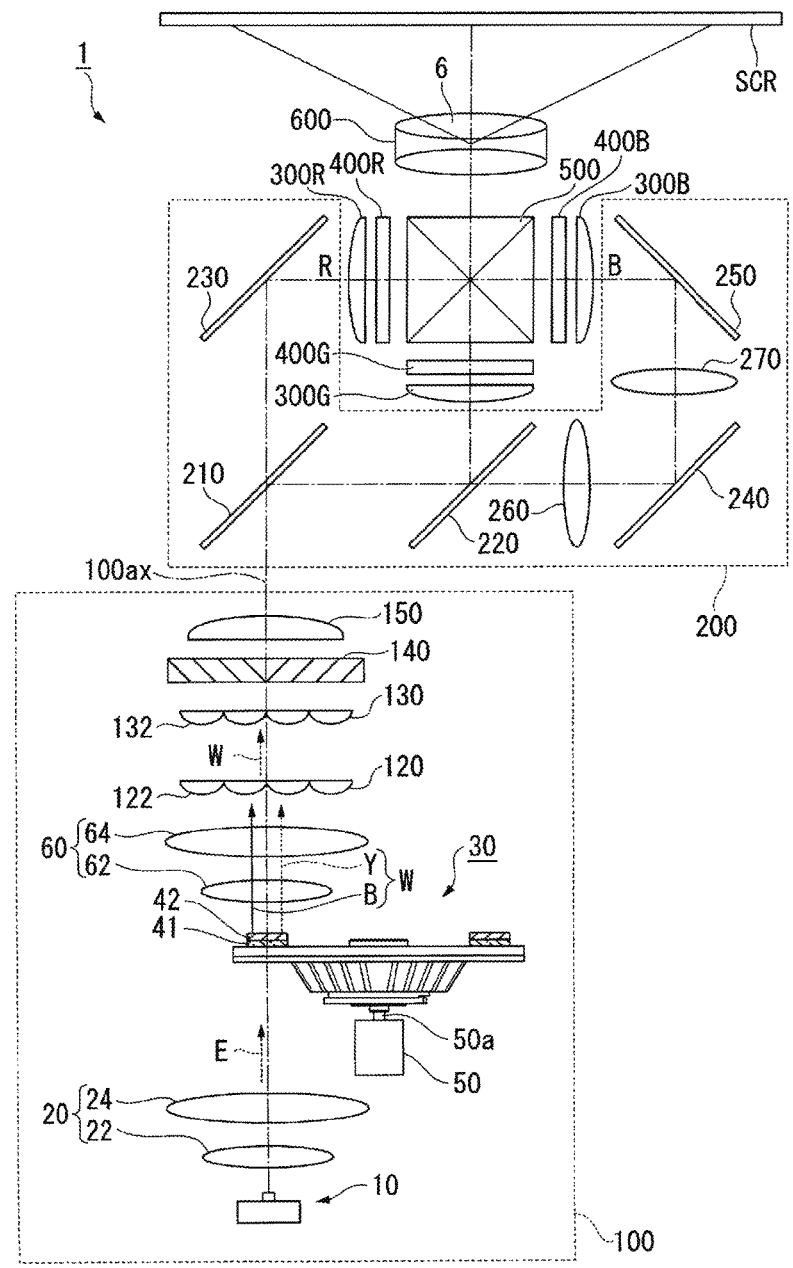
FIG. 1 shows the configuration of the optical system of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a projector according to the present embodiment will be described. The projector according to the present embodiment is a projection-type image display apparatus that displays color video images on a screen (projection surface) SCR.

FIG. 1 is a top view showing the optical system of the projector according to the present embodiment.

A projector 1 includes an illuminator 100, a color separation/light guide system 200, liquid crystal light modulators 400R, 400G, and 400B corresponding to red light, green light, and blue light, a cross dichroic prism 500, and a projection system 600, as shown in FIG. 1.

The illuminator 100 includes a light source 10, a collimator light collection system 20, a rotary fluorescent plate (wavelength converter) 30, a motor (rotating device) 50, a pickup system 60, a first lens array 120, a second lens array 130, a polarization conversion element 140, and a superimposing lens 150. The collimator light collection system 20, the pickup system 60, the first lens array 120, the second lens array 130, the polarization conversion element 140, and the superimposing lens 150 are so arranged that the optical axes thereof roughly coincide with the optical axis of the light source 10.

The light source 10 is formed of a semiconductor laser (light emitting device) that emits, as excitation light E, blue light that belongs to a first wavelength band (intensity of emitted light peaks at about 445 nm) and is formed of a laser beam. The light source 10 may be formed of a single semiconductor laser or a large number of semiconductor lasers.

The light source 10 can instead be a semiconductor laser that emits blue light having a wavelength other than 445 nm (460 nm, for example).

In the present embodiment, the light source 10 is so disposed that the optical axis thereof is perpendicular to an illumination optical axis 100ax.

The collimator light collection system 20 includes a first lens 22 and a second lens 24 and roughly parallelizes the light from the light source 10. Each of the first lens 22 and the second lens 24 is formed of a convex lens.

The collimator light collection system 20 has a function of roughly focusing the excitation light E emitted from the light source 10 and causing the resultant excitation light E to be incident on a phosphor layer 42.

The pickup system 60 includes a first lens 62 and a second lens 64. Each of the first lens 62 and the second lens 64 is formed of a convex lens.

The pickup system 60 has a function of picking up illumination light W containing fluorescence Y emitted from the phosphor layer 42 and blue light B having passed through the phosphor layer 42 and parallelizing the illumination light W into parallelized light.

Figure 2A:
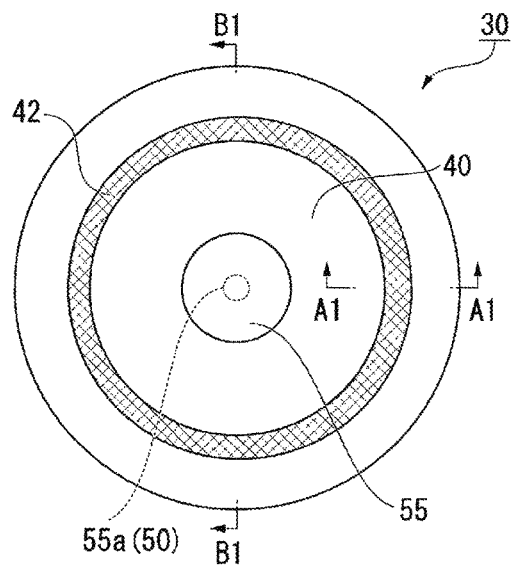
FIGS. 2A and 2B describe a rotary fluorescent plate.
Figure 2B:
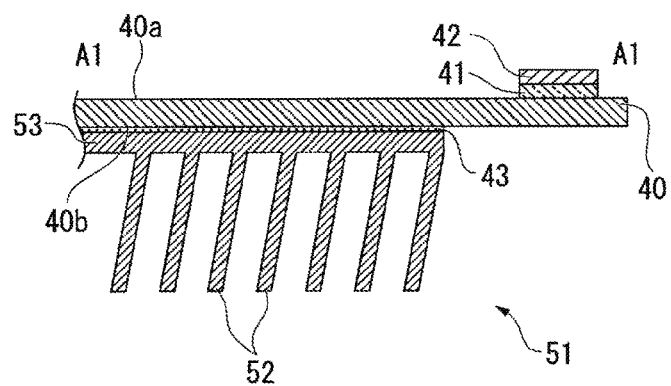

FIGS. 2A and 2B describe the rotary fluorescent plate 30 according to the embodiment. FIG. 2A is a front view of the rotary fluorescent plate 30, and FIG. 2B is a cross-sectional view taken along the line A1-A1 in FIG. 2A.

The rotary fluorescent plate 30 includes the motor 50, a disk (substrate) 40, a dichroic mirror 41, the phosphor layer (wavelength conversion element) 42, and a heat sink 51, as shown in FIG. 1 and FIGS. 2A and 2B. The rotary fluorescent plate 30 outputs yellow light Y (fluorescence Y) containing red light and green light toward the side opposite the side on which the blue light (excitation light) E is incident.

The disk 40 can be rotated by the motor 50. The disk 40 is formed of a light transmissive member that transmits the excitation light E. The disk 40 can be made, for example, of quartz glass, quartz crystal, sapphire, optical glass, or a transparent resin.

The phosphor layer 42 is provided on the upper surface (first surface) 40a of the disk 40 along the circumferential direction thereof. The heat sink 51 is provided on the lower surface (second surface) 40b of the disk 40.

The motor 50 includes a rotary shaft 50a and a hub 55. One end side of the hub 55 is attached to the rotary shaft 50a and rotatable along with the rotary shaft 50a. The other end side of the hub 55 is fit into an attachment hole provided through the disk 40 and the heat sink 51. In the present embodiment, the hub 55 functions as a fixing member that fixes the disk 40 and the heat sink 51 to each other. Use of the hub 55 as the fixing member allows the rotary fluorescent plate 30 to be readily assembled. Further, since the disk 40 and the heat sink 51 are reliably fixed to each other via the hub 55, occurrence of surface wobble due to rotation of the rotary shaft 50a can be suppressed.

In the present embodiment, each of the dichroic mirror 41 and the phosphor layer 42 has the shape of a ring.

The phosphor layer 42 is excited with the excitation light E from the light source 10 and emits the fluorescence Y, which belongs to a second wavelength band. The surface of the phosphor layer 42 on which the excitation light E is incident is also the surface from which the fluorescence Y is emitted. The fluorescence Y is yellow light containing red light and green light. The phosphor layer 42 is formed, for example, of a layer containing $(Y,Gd)_3(Al,Ga)_5O_{12}$:Ce, which is a YAG-based phosphor.

The dichroic mirror 41 is provided between the phosphor layer 42 and the disk 40, transmits part of the excitation light E, and reflects the fluorescence Y. The dichroic mirror 41 is formed of a dielectric multilayer film. The excitation light E having passed through the dichroic mirror 41 is incident on the phosphor layer 42.

Part of the excitation light E passes through the phosphor layer 42. The portion of the excitation light E that has passed through the phosphor layer 42 is hereinafter referred to as blue light B. The blue light B having passed through the phosphor layer 42 and the fluorescence Y emitted from the phosphor layer 42 are combined with each other to produce white illumination light W.

In the present embodiment, since the excitation light E formed of a laser beam is incident on the phosphor layer 42, heat is generated in the phosphor layer 42. In the present embodiment, the disk 40 is rotated so that the position on the phosphor layer 42 where the excitation light E is incident successively changes. A situation in which the same portion of the phosphor layer 42 is intensively irradiated with the excitation light E and is therefore degraded is therefore avoided.

Further, in the present embodiment, the heat sink 51 is a member different from the disk 40. The disk 40 is formed of a light transmissive member that transmits the excitation light E, and the thermal conductivity of the light transmissive member is lower than that of a metal. It is therefore necessary to provide the phosphor layer 42 with a heat dissipater. In the present embodiment, the heat in the phosphor layer 42 is transferred via the disk 40 to the heat sink 51, which is a member different from the disk 40, whereby the heat in the phosphor layer 42 is efficiently dissipated.

Further, in the present embodiment, a thermally conductive adhesive member 43 is disposed between the heat sink 51 and the disk 40 (see FIG. 2B). The thermally conductive adhesive member 43 is made, for example, of a resin containing thermally conductive adhesive fillers. The thermally conductive adhesive member 43 adhesively fixes the disk 40 and the heat sink 51 to each other to suppress an increase in thermal resistance between the disk 40 and the heat sink 51. The thermally conductive adhesive member 43 can thus efficiently transfer the heat in the phosphor layer 42 provided on the disk 40 toward the heat sink 51. Further, the thermally conductive adhesive member 43, which adhesively fixes the disk 40 and the heat sink 51, which differ from each other in terms of physical properties (such as Young's modulus and linear expansion coefficient), to each other, preferably has physical properties intermediate between those of the disk 40 and those of the heat sink 51.

In the present embodiment, the heat sink 51 is provided in a position closer to the rotary shaft 50a (center of rotation) of the motor 50 than the phosphor layer 42. That is, the heat sink 51 is disposed in a position inside in the radial direction of the disk 40 than the phosphor layer 42.

The configuration described above, in which the phosphor layer 42 is disposed in an outer circumferential portion of the disk 40, allows the outer diameter (surface area) of the phosphor layer 42 to be maximized. A situation in which the same portion of the phosphor layer 42 is intensively irradiated with the excitation light E and is therefore degraded can be avoided. Further, since the temperature of the phosphor layer 42 is unlikely to increase, the life of the phosphor layer 42 itself can be prolonged.

Figure 3A:
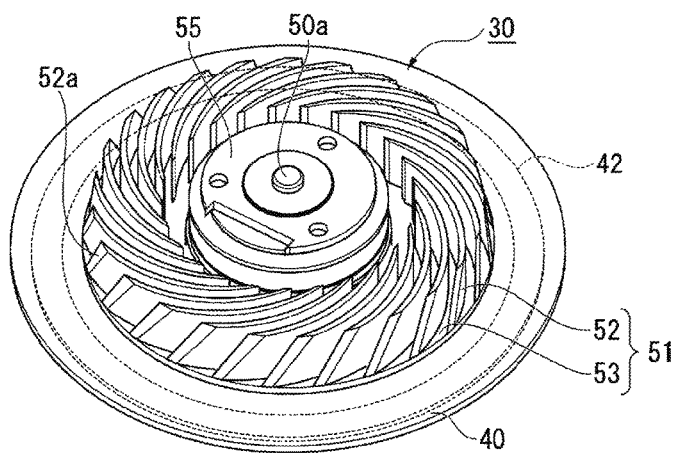
FIGS. 3A and 3B show a schematic configuration of a heat sink.
Figure 3B:
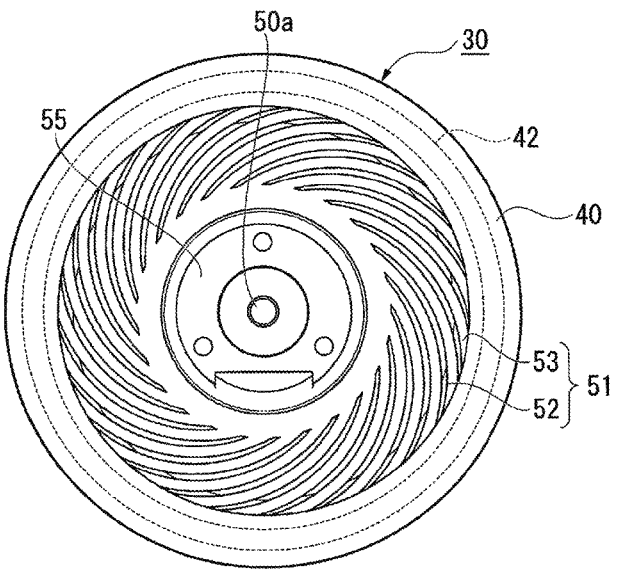

FIGS. 3A and 3B show a schematic configuration of the heat sink 51. FIG. 3A is a perspective view showing the structure of the heat sink 51, and FIG. 3B is a plan view showing the configuration of the heat sink 51.

The heat sink 51 is made, for example, of a metal material that excels in heat dissipation, such as aluminum and copper. The heat sink 51 includes a plurality of fins 52 and a flat plate 53, as shown in FIG. 2B and FIGS. 3A and 3B.

The plurality of fins 52 are integrated with the flat plate 53. The plurality of fins 52 are so arranged as to surround the hub 55, as shown in FIGS. 3A and 3B. Each of the plurality of fins 52 is formed of a protruding member so curved in a swirl shape extending from the radially outer side of the disk 40 toward the radially inner side thereof in a plan view, as shown in FIG. 3B. The fins 52 formed of the thus configured protruding members allow reduction in air resistance produced when the disk 40 rotates.

To improve the cooling performance of the heat sink 51, it is important to increase the outer diameter of the fins 52. In the present embodiment, since the excitation light E is incident through the lower surface 40b of the disk 40, too large a size of the fins 52 may undesirably cause the excitation light E to be blocked.

In contrast, in the present embodiment, each of the plurality of fins 52 has a side portion 52a that faces the outer circumferential side of the disk 40 and has an inclining shape. The inclining shape of each of the side portions 52a is so configured that the side portion 52a so inclines as to approach the rotary shaft 50a of the motor 50 with distance from the lower surface 40b of the disk 40 (see FIG. 4).

Figure 4:
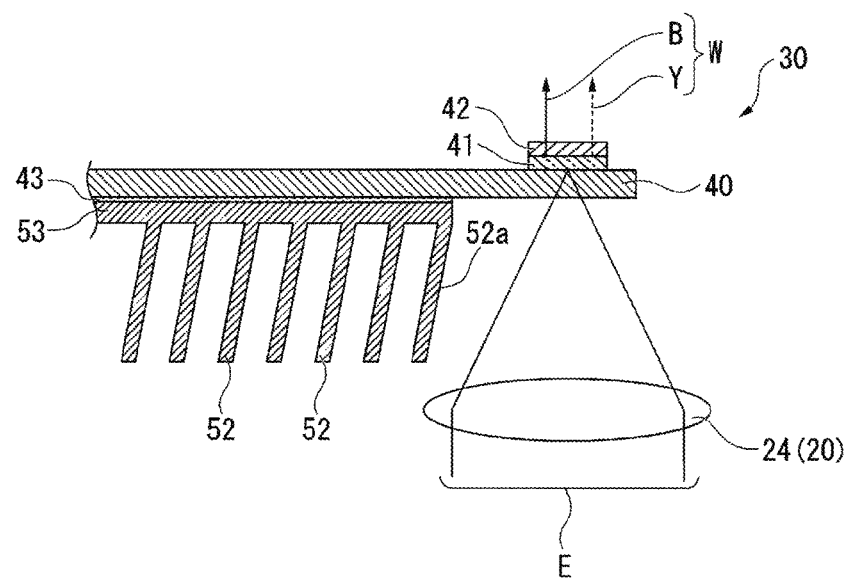
FIG. 4 is a conceptual view showing excitation light incident on a phosphor layer 42.

FIG. 4 is a conceptual view showing the excitation light E incident on the phosphor layer 42 through the lower surface 40b of the disk 40.

Since the excitation light E is focused by the collimator light collection system 20, the light flux width of the excitation light E decreases with distance toward the disk 40, as shown in FIG. 4. Since the side portions 52a of the plurality of fins 52 have the inclining shape described above, the excitation light E is not blocked by the fins 52 but can be incident on the phosphor layer 42 through the lower surface 40b of the disk 40. The fluorescence Y can therefore be efficiently produced, whereby bright illumination light W can be produced.

Referring back to FIG. 1, the first lens array 120 has a plurality of first lenslets 122 for dividing the light having passed through the dichroic mirror 41 into a plurality of sub-light fluxes. The plurality of first lenslets 122 are arranged in a matrix in a plane perpendicular to the illumination optical axis 100ax.

The second lens array 130 has a plurality of second lenslets 132 corresponding to the plurality of first lenslets 122 of the first lens array 120. The second lens array 130, along with the superimposing lens 150, forms images of the first lenslets 122 of the first lens array 120 in the vicinity of image formation regions of the liquid crystal light modulators 400R, 400G, and 400B. The plurality of second lenslets 132 are arranged in a matrix in a plane perpendicular to the illumination optical axis 100ax.

The polarization conversion element 140 converts each of the divided sub-light fluxes from the first lens array 120 into linearly polarized light. The polarization conversion element 140 has a polarization separation layer, a reflection layer, and a retardation film. The polarization separation layer directly transmits one linearly polarized light component of the polarized light components contained in the light from the rotary fluorescent plate 30 and reflects another linearly polarized light component toward the reflection layer.

The reflection layer reflects the other linearly polarized light component reflected off the polarization separation layer in the direction parallel to the illumination optical axis 100ax. The retardation film converts the other linearly polarized light component reflected off the reflection layer into the one linearly polarized light component.

The superimposing lens 150 collects the sub-light fluxes from the polarization conversion element 140 and superimposes the sub-light fluxes on one another in the vicinity of the image formation regions of the liquid crystal light modulators 400R, 400G, and 400B. The first lens array 120, the second lens array 130, and the superimposing lens 150 form an optical integration system that homogenizes the in-plane optical intensity distribution of the light from the rotary fluorescent plate 30.

The color separation/light guide system 200 includes dichroic mirrors 210 and 220, reflection mirrors 230, 240, and 250, and relay lenses 260 and 270. The color separation/light guide system 200 separates the white illumination light W from the illuminator 100 into red light R, green light G, and blue light B and guides the red light R, the green light G, and the blue light B to the corresponding liquid crystal light modulators 400R, 400G, and 400B, respectively.

Field lenses 300R, 300G, and 300B are disposed between the color separation/light guide system 200 and the liquid crystal light modulators 400R, 400G, 400B.

The dichroic mirror 210 is a dichroic mirror that transmits the red light component and reflects the green light component and the blue light component.

The dichroic mirror 220 is a dichroic mirror that reflects the green light component and transmits the blue light component.

The reflection mirror 230 is a reflection mirror that reflects the red light component.

The reflection mirrors 240 and 250 are reflection mirrors that reflect the blue light component.

The red light having passed through the dichroic mirror 210 is reflected off the reflection mirror 230, passes through the field lens 300R, and is incident on the image formation region of the liquid crystal light modulator 400R for red light.

The green light reflected off the dichroic mirror 210 is further reflected off the dichroic mirror 220, passes through the field lens 300G, and is incident on the image formation region of the liquid crystal light modulator 400G for green light.

The blue light having passed through the dichroic mirror 220 travels via the relay lens 260, the light-incident-side reflection mirror 240, the relay lens 270, the light-exiting-side reflection mirror 250, and the field lens 300B and is incident on the image formation region of the liquid crystal light modulator 400B for blue light.

The liquid crystal light modulators 400R, 400G, and 400B modulate the color light flexes incident thereon in accordance with image information to form images corresponding to the color light fluxes. Although not shown, light-incident-side polarizers are disposed between the field lenses 300R, 300G, 300B and the liquid crystal light modulators 400R, 400G, 400B, and light-exiting-side polarizers are disposed between the liquid crystal light modulators 400R, 400G, 400B and the cross dichroic prism 500.

The cross dichroic prism 500 is an optical element that combines the image light fluxes outputted from the liquid crystal light modulators 400R, 400G, and 400B with one another to form a color image.

The cross dichroic prism 500 is formed by bonding four rectangular prisms to each other and thus has a roughly square shape in a plan view, and dielectric multilayer films are formed on the roughly X-letter-shaped interfaces between the bonded rectangular prisms.

The color image having exited out of the cross dichroic prism 500 is enlarged and projected by the projection system 600 and forms an image on the screen SCR.

As described above, according to the present embodiment, the heat sink 51 can cool the phosphor layer 42. The rotary fluorescent plate 30 provided by the present embodiment therefore allows the phosphor layer 42 to be so cooled that the temperature of the phosphor layer 42 is lowered.

The illuminator 100 including the rotary fluorescent plate 30 can produce highly reliable, bright illumination light W. The projector 1 including the illuminator 100 can display an image that excels in quality.

The above embodiment has been described with reference to the case where the thermally conductive adhesive member 43 is disposed between the disk 40 and the heat sink 51, but the invention is not limited to the case. For example, when the surface of the flat plate 53 of the heat sink 51 and the surface of the disk 40 that are in contact with each other have high flatness, the flat plate 53 and the lower surface 40b of the disk 40 may be allowed to be in surface contact with each other.

Figure 5:
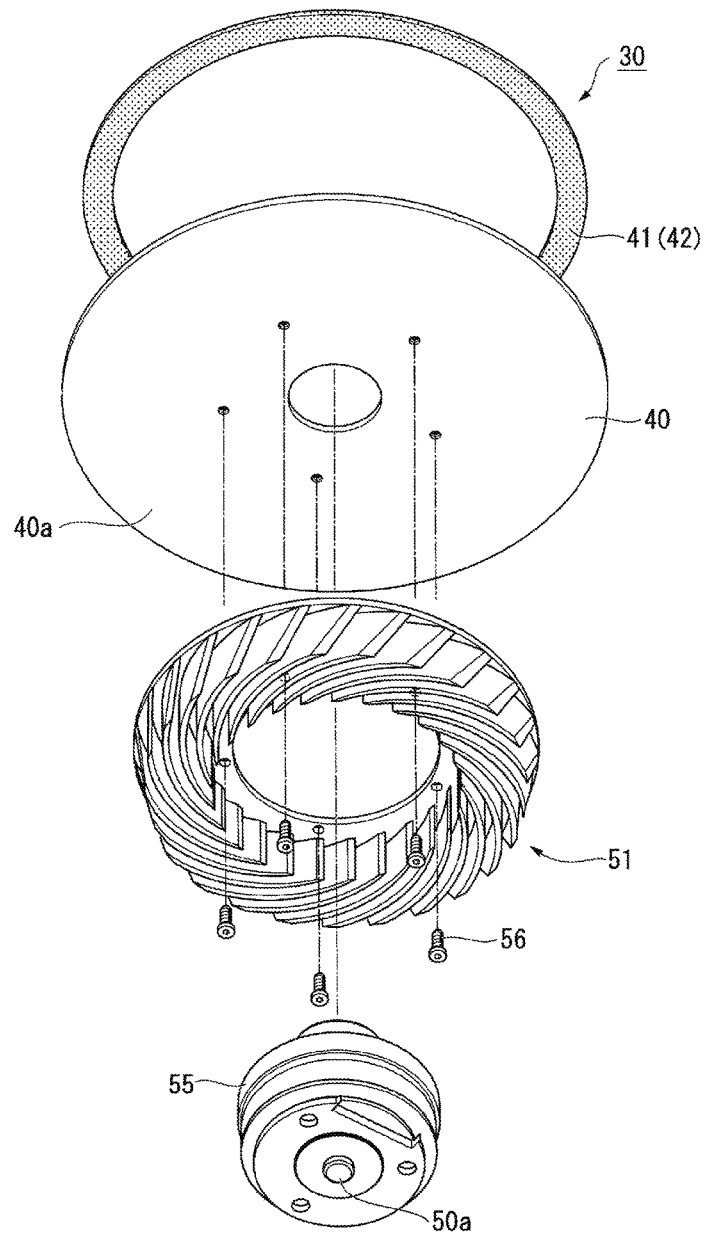
FIG. 5 is an exploded perspective view showing the structure of the rotary fluorescent plate according to a variation.
Figure 6:
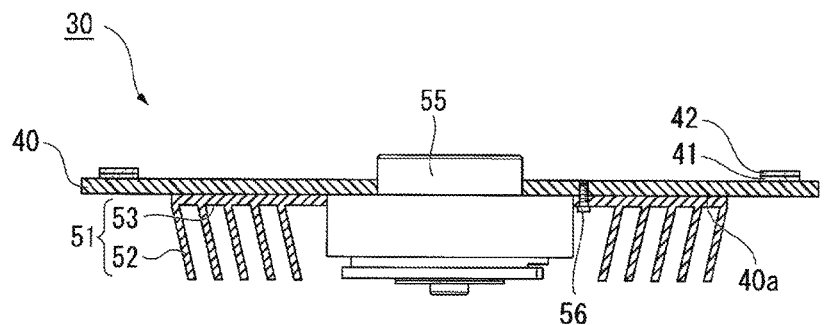
FIG. 6 is a cross-sectional view showing the structure of the rotary fluorescent plate according to the variation.

FIG. 5 is an exploded perspective view in a case where the flat plate 53 and the disk 40 are in surface contact with each other, and FIG. 6 is a cross-sectional configuration diagram in the case where the flat plate 53 and the disk 40 are in surface contact with each other.

The heat sink 51 is fixed to the disk 40, for example, with screw members (fixing members) 56, as shown in FIGS. 5 and 6. In this configuration, since the flat plate 53 and the disk 40 are securely fixed to each other in such a way that the two components are in contact with over a wide area, heat is efficiently transferred from the disk 40 to the heat sink 51 (flat plate 53), whereby high heat dissipation performance is achieved. Further, since the heat sink 51 is securely fixed to the disk 40 with the screw members 56, occurrence of surface wobble due to rotation of the rotary shaft 50a can be suppressed. Moreover, since the disk 40 and the heat sink 51 are not adhesively fixed to each other, warpage, deformation, or other undesirable results due to the difference in physical properties between the disk 40 and the heat sink 51 will not occur. Further, the screw members 56 are inserted through the heat sink 51 in FIGS. 5 and 6 but may instead be inserted through the disk 40.

Second Embodiment

A second embodiment of the invention will subsequently be described. The present embodiment differs from the embodiment described above in terms of the structure of the heat sink, and the other structures of the present embodiment are the same as those in the embodiment described above. In the following description, the same configurations and members as those in the embodiment described above have the same reference characters and will not be described in detail.

Figure 7:
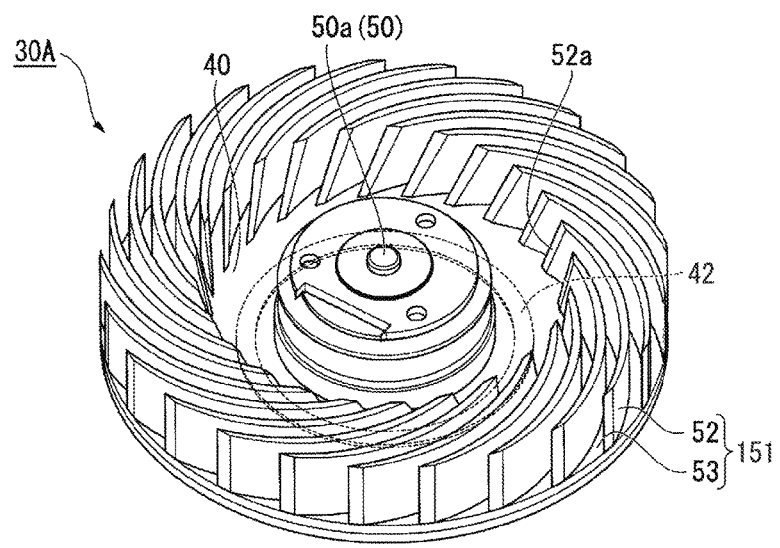
FIG. 7 is a perspective view of a rotary fluorescent plate according to a second embodiment.

FIG. 7 is a perspective view of a rotary fluorescent plate 30A according to the present embodiment.

In the rotary fluorescent plate 30A according to the present embodiment, the phosphor layer 42 is provided in a position closer to the rotary shaft 50a (center of rotation) of the motor 50 than a heat sink 151 (plurality of fins 52), as shown in FIG. 7.

That is, the heat sink 151 is disposed in a position outside in the radial direction of the disk 40 than the phosphor layer 42. The configuration described above, in which the heat sink is disposed in an outer circumferential portion of the disk 40, allows the surface area of the fins 52 to be increased as compared with the configuration of the embodiment described above. The cooling performance of the heat sink 151 can therefore be improved.

The outer diameter of the heat sink 151 may be greater than the outer diameter of the disk 40. In this case, the outer diameter of the plurality of fins 52 may be equal to the outer diameter of the flat plate 53, or the outer diameter of the fins 52 may be greater than the outer diameter of the flat plate 53.

In the rotary fluorescent plate 30A, when the size of the fins 52 on the inner side in the radial direction of the disk 40 is too large, the fins 52 could undesirably block the excitation light E.

In the rotary fluorescent plate 30A according to the present embodiment, however, each of the plurality of fins 52 has a side portion 52b that faces the rotary shaft 50a of the motor 50 of the disk 40 and has an inclining shape. The inclining shape of each of the side portions 52b is so configured that the side portion 52b so inclines as to be separate away from the rotary shaft 50a of the motor 50 with distance from the lower surface 40b of the disk 40.

Since the side portions 52b of the plurality of fins 52 have the inclining shape described above, the excitation light E is not blocked by the fins 52. The excitation light E can therefore be efficiently incident on the phosphor layer 42 through the lower surface 40b of the disk 40, whereby bright illumination light W can be produced.

The invention is not necessarily limited to the embodiments described above, and a variety of changes can be made thereto to the extent that the changes do not depart from the substance of the invention.

For example, the configuration of the first embodiment and the configuration of the second embodiment may be combined with each other. That is, the two heat sinks 51 and 151 may be disposed on the disk 40.

Further, the projector 1 including the three liquid crystal light modulators 400R, 400G, and 400B is presented by way of example in the embodiments described above. The invention is also applicable to a projector in which a single liquid crystal light modulator is used to display color video images. Further, a digital mirror device may be used as each of the light modulators.

In the embodiments described above, the case where the illuminator according to any of the embodiments of the invention is incorporated in a projector is presented by way of example, but the illuminator is not necessarily incorporated in a projector. The illuminator according to any of the embodiments of the invention may also be used in a lighting appliance, a headlight of an automobile, and other apparatus.

What is claimed is:

1. A wavelength converter comprising:
    a rotating device;
    a substrate rotated by the rotating device;
    a wavelength conversion element provided on a first surface of the substrate; and
    a heat sink that is provided on a second surface facing away from the first surface and is a member different from the substrate,
    wherein
        the heat sink includes a plurality of fins,
        each of the plurality of fins includes a first side portion that faces an adjacent fin included in the plurality of fins, a second side portion that is provided opposite to the first side portion and that faces an additional adjacent fin included in the plurality of fins, a first end side portion that faces the rotating device, and a second end side portion that faces an outer circumference of the substrate,
        in each of the plurality of fins,
            one of the first end side portion that faces the rotating device and the second end side portion that faces the outer circumference of the substrate has an inclining shape that inclines from a direction parallel to a rotational axis of the rotating device, and
            the other of the first end side portion that faces the rotating device and the second end side portion that faces the outer circumference of the substrate has a shape that is parallel to the rotational axis of the rotating device, and
        the substrate is formed of a light transmissive member.

2. The wavelength converter according to claim 1, wherein the plurality of fins are provided in a position closer to a center of rotation of the rotating device than the wavelength conversion element.

3. The wavelength converter according to claim 1, wherein the wavelength conversion element is provided in a position closer to a center of rotation of the rotating device than the plurality of fins.

4. The wavelength converter according to claim 1, wherein the inclining shape is so configured that an end side portion included in the one of the first end side portion that faces the rotating device and the second end side portion that faces the outer circumference of the substrate so inclines as to approach or to be separate away from the center of rotation of the rotating device with distance from the substrate.

5. An illuminator comprising:
a light source; and
the wavelength converter according to claim 1,
wherein light that belongs to a first wavelength band and is emitted from the light source is caused to be incident on the second surface, and the light that belongs to the first wavelength band exits through the first surface and is converted to light that belongs to a second wavelength band by the wavelength conversion element.

6. An illuminator comprising:
a light source; and
the wavelength converter according to claim 2,
wherein light that belongs to a first wavelength band and is emitted from the light source is caused to be incident on the second surface, and the light that belongs to the first wavelength band exits through the first surface and is converted to light that belongs to a second wavelength band by the wavelength conversion element.

7. An illuminator comprising:
a light source; and
the wavelength converter according to claim 3,
wherein light that belongs to a first wavelength band and is emitted from the light source is caused to be incident on the second surface, and the light that belongs to the first wavelength band exits through the first surface and is converted to light that belongs to a second wavelength band by the wavelength conversion element.

8. An illuminator comprising:
a light source; and
the wavelength converter according to claim 4,
wherein light that belongs to a first wavelength band and is emitted from the light source is caused to be incident on the second surface, and the light that belongs to the first wavelength band exits through the first surface and is converted to light that belongs to a second wavelength band by the wavelength conversion element.

9. A projector comprising:
the illuminator according to claim 5;
a light modulator that modulates illumination light from the illuminator in accordance with image information to form image light; and
a projection system that projects the image light.

10. A projector comprising:
the illuminator according to claim 6;
a light modulator that modulates illumination light from the illuminator in accordance with image information to form image light; and
a projection system that projects the image light.

11. A projector comprising:
the illuminator according to claim 7;
a light modulator that modulates illumination light from the illuminator in accordance with image information to form image light; and
a projection system that projects the image light.

12. A projector comprising:
the illuminator according to claim 8;
a light modulator that modulates illumination light from the illuminator in accordance with image information to form image light; and
a projection system that projects the image light.

* * * * *